(12) United States Patent
Vaughn et al.

(10) Patent No.: US 7,017,425 B1
(45) Date of Patent: Mar. 28, 2006

(54) BUCKET WHEEL ASSEMBLY FOR FLUID FLOW METERS

(76) Inventors: Edward C. Vaughn, 316 Raleigh Dr., Slidell, LA (US) 70460; Janice M. Fulford, 621 Highland Dr., Bay St. Louis, MS (US) 39520; Harold R. Myers, 10 Ryan Cir., Long Beach, MS (US) 39560

( * ) Notice: Subject to any disclaimer, the term of this patent is extended or adjusted under 35 U.S.C. 154(b) by 37 days.

(21) Appl. No.: 11/101,117

(22) Filed: Apr. 4, 2005

(51) Int. Cl.
*G01F 1/28* (2006.01)
(52) U.S. Cl. .................................. 73/861.71; 73/861.75
(58) Field of Classification Search ...................... None
See application file for complete search history.

(56) References Cited

U.S. PATENT DOCUMENTS 1,593,291 A * 7/1926 Critchlow ................ 73/861.92
3,541,855 A * 11/1970 Frenzen et al. .......... 73/861.85
4,840,062 A 6/1989 Futrell, II
4,866,985 A 9/1989 Futrell, II \* cited by examiner

*Primary Examiner*—Harshad Patel

(57) ABSTRACT

An improved bucket wheel assembly with a center frame, having a plurality of fingers extending therefrom. In each of the fingers a slot is formed. The assembly also includes a plurality of conically shaped hollow cups. The hollow cups each have a wall that forms an apex and a circular opening. The hollow cups may also have a second slot formed by two substantially parallel protuberances on the inner surface of each hollow cup. The hollow cups are attached to the center frame by matching the slots and sliding one into the other, so that a portion of the finger is between the protuberances, from the opening of each hollow cup. The hollow cup is slid into the slot until it reaches the bottom of the slot on the finger.

10 Claims, 1 Drawing Sheet

BUCKET WHEEL ASSEMBLY FOR FLUID FLOW METERS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates in general to fluid flow meters, more particularly to Price Type-AA fluid flow meters, and most particularly to the bucket wheel assembly used in Price Type-AA fluid flow meters.

2. Description of the Related Art

Measurements of water flow are of interest to those in the fields of managing water resources, designing water control structures, or investigating hydrologic systems. Many devices have been designed to measure flow in open channel systems. For many years, the U.S. Geological Survey has employed Price Type-AA fluid flow meters in the field for this purpose.

In operation, the Price Type-AA fluid flow meter employs a bucket wheel assembly that is mounted upon a shaft and rotates in response to fluid flow, generating a signal that is proportional to the fluid flow velocity. The current bucket wheel assembly is made of plated brass. It employs six hollow conical cups that are hand formed from sheet metal and individually soldered to a brass, star-shaped frame. The finished unit is then plated. The frame is shaped so that a strut connects the apex of each cup to the outer diameter of the following cup around the frame.

There are several problems associated with the metal wheel bucket assembly associated with the current Price Type-AA fluid flow meter. First, due to the building process described above, it is difficult to maintain precise dimensional control of the parts of the assembly. In order to obtain an accurate fluid flow reading using the Price Type-AA fluid flow meter, the "cups" of the bucket wheel must be as close to identical in dimensions and position as possible. Second, the struts used to attach the cups to the center frame provide a poor response to vertically angled water flow. Third, the cost of the metal assembly, due to parts and hand fabrication is relatively high.

In order to address some of these problems, a plastic version of the bucket wheel assembly was developed and disclosed in U.S. Pat. No. 4,866,985. This bucket wheel assembly was made from polycarbonate or polyethylene plastics. It comprised six non-hollow, conical cups and a center disc that were injection molded as one piece. While this design addressed the cost issue noted above, the design performed poorly in comparison to the metal bucket wheel assembly. This design was found to under register velocity in field conditions because of its poor cosine response to vertically angled water flows. The poor cosine response was due to the solid cups. Due to these limitations, this metal bucket assembly is still used under most conditions today.

Therefore, it is desired to provide a bucket wheel assembly for use in a Price Type-AA fluid flow meter that is relatively low in cost and provides at least the performance of the metal bucket wheel assembly used currently.

SUMMARY OF THE INVENTION

The invention proposed herein comprises an improved bucket wheel assembly for a fluid flow meter. The parts of the assembly may be injection molded and easily assembled and the assembly provides superior performance compared to currently used metal or plastic bucket wheel assemblies.

Accordingly, it is an object of this invention to provide a bucket wheel assembly for a fluid flow meter that is relatively low cost compared to currently used bucket wheel assemblies.

It is a further object of this invention to provide a bucket wheel assembly that provides more precise performance compared to currently used bucket wheel assemblies.

This invention meets these and other objectives related to bucket wheels for fluid meters by providing a bucket wheel assembly that is formed of a high-strength plastic material. Due to this type of construction, the elements of the assembly may be manufactured by injection molding techniques. In general the assembly comprises a center frame, having a plurality of fingers extending therefrom. In each of the fingers a slot is formed. The assembly also includes a plurality of conically shaped hollow cups. The hollow cups each have a wall that forms an apex and a circular opening. The hollow cups may also have a second slot formed by two substantially parallel protuberances on the inner surface of each hollow cup. The hollow cups are attached to the center frame by matching the slots and sliding one into the other, so that a portion of the finger is between the protuberances, from the opening of each hollow cup. The hollow cup is slid into the slot until it reaches the bottom of the slot on the finger.

BRIEF DESCRIPTION OF THE DRAWINGS

The accompanying drawings, which are incorporated in and constitutes a part of the specification, illustrate an embodiment of the invention, and, together with the description, serve to explain the principles of the invention.

DESCRIPTION OF PREFERRED EMBODIMENTS

The invention, as embodied herein, comprises an improved bucket wheel assembly for a fluid flow meter used in open channel water systems. The invention provides a significant cost reduction to the metal bucket wheel assemblies currently employed in such devices as well as increasing the performance of the system due to improvement in dimensional controls of the parts of the assembly, decreased weight of the assembly, and improved design of the assembly.

A bucket wheel assembly is installed in a Price Type-AA fluid flow meter to translate the linear motion of water flow around the meter into a rotational velocity. The rate at which the wheel rotates for a given constant water flow velocity is determined by tow tank testing and linear regression analysis of test data. This results in a rating equation typically of the form $V=a+bR$, where $V$ is the water flow velocity, $R$ is the wheel revolutions per second, and "a" and "b" are constants determined by linear regression of the test data. The velocity of the water flow can be determined by counting and timing the rotations of the wheel about the meter axis and using the wheel revolutions per second in a rating equation derived for the specific bucket wheel characteristics. Thus, it is extremely important to obtain an accurate flow that all of the elements of the bucket wheel assembly be dimensionally consistent.

As described above, most current bucket wheel assemblies employed in fluid flow meters are assemblies constructed of metal and some of the elements of the assemblies must be made by hand. Due to these limitations, dimensional control of the parts of the assemblies is extremely difficult. Therefore, performance of these bucket wheels are suspect because of potential variation in the size of the cups.

The present invention elements are constructed of a high-strength plastic material, such as ABS plastic, which provides several advantages over the metal bucket wheel assemblies. These parts can be manufactured by injection molding techniques, which greatly increases dimensional control of the parts. This manufacturing process also should decrease the cost of the assembly by five to ten times. Also, the use of plastic material should decrease the weight of assembly by about 66% (from about 5.4 ounces to about 1.8 ounces). This will make the assembly and fluid flow meter much more responsive at lower water velocities. Still further, the elasticity of the plastic material maintains dimensional integrity when the wheel strikes objects, such as floating debris or bridge structures, versus potential metal "bending" under such conditions.

Figure 1:
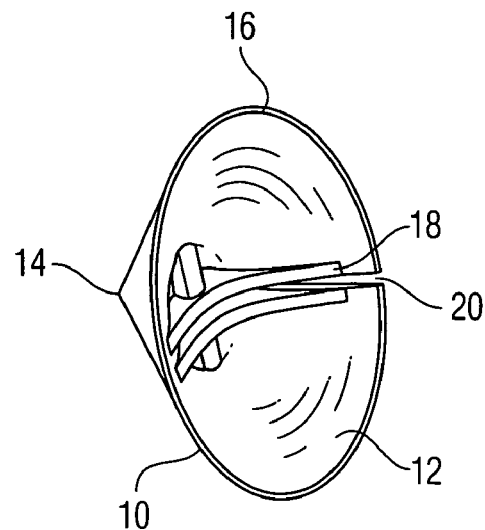
FIG. 1 is an angled view of on of the cups of the present invention removed from the frame.
Figure 2:
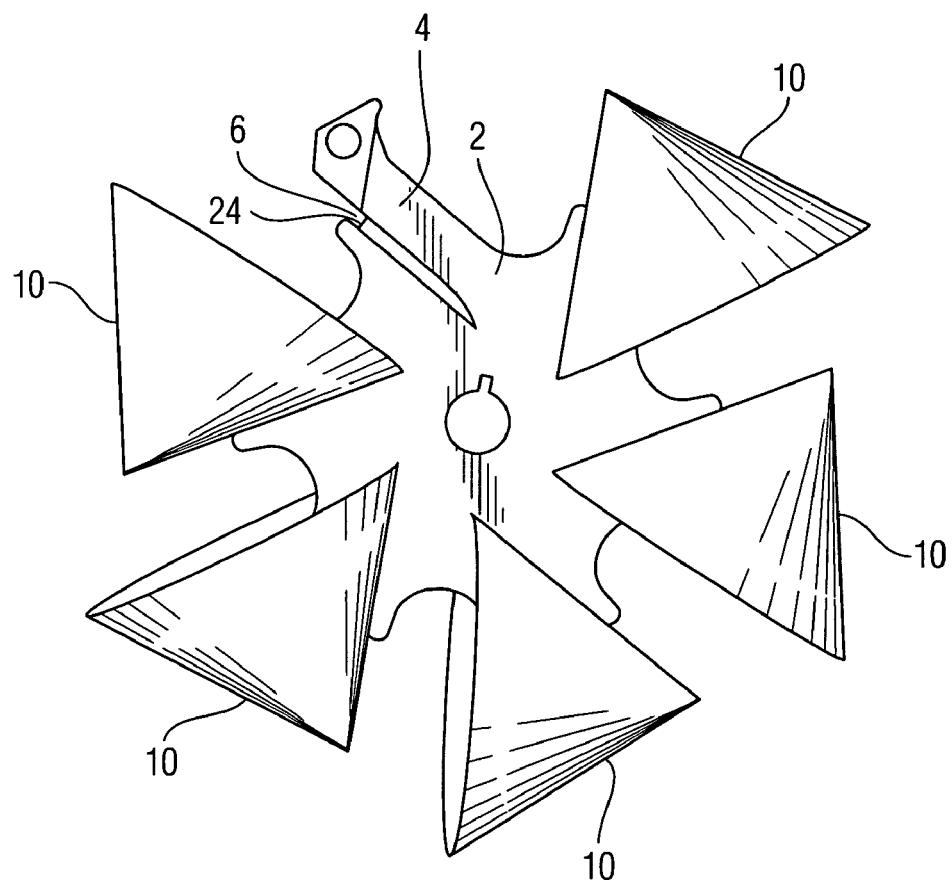
FIG. 2 is a side view of an embodiment of the invention with one of the hollow cups removed from the frame.

Referring to FIGS. 1 and 2, the invention comprises a bucket wheel assembly for a fluid flow meter. A center frame 2, formed of a plastic material, has a plurality of fingers 4 extending from it. In a preferred embodiment, six fingers 4 extend from the center frame 2. Each finger 4 has a slot 6 formed therein. The slot 6 length depends upon the size of the assembly and may be selected by one skilled in the art.

A plurality of conically shaped hollow cups 10, equal in number to the fingers 4, are also employed in the present invention. The hollow cups 10 are made of the same material as the center frame, preferably ABS plastic. Each hollow cup 10 comprises a wall 12 that forms an apex 14 and a circular shaped opening 16. In a preferred embodiment, a pair of protuberances 18 are formed on the inside of the wall 12 of each cup 10. The protuberances 18 form a second slot 20. Finally, it is also preferred that the wall 12 be beveled as it approaches the opening 16. While the amount of beveling may be selected by one skilled in the art, an example would be the wall 12 going from a width of about 0.75 hundredths of an inch to about 0.3 hundredths of an inch. This beveling improves the response of the bucket wheel assembly in low velocity water flow.

The device is assembled in the following manner. The second slot 20 is matched with the slot 6 and the cup 20 is slid into slot 6 from the opening 16. The cup is slid until it reaches the bottom 24 of the slot 6. A portion of the finger 4 is now between the protuberances 18. All of the cups 10 are placed upon the fingers 4 in this manner. Preferably, an adhesive or chemical welding material is placed on slot 6 and/or between protuberances 18 in slot 20 prior to sliding cup 20 into slot 6 from opening 16. Optionally, other methods of providing a structural bonding between the fingers 4 and the cups 10 may be employed. For example, holes may be drilled through the fingers 4 and cups and pins may be inserted therein.

What is described are specific examples of many possible variations on the same invention and are not intended in a limiting sense. The claimed invention can be practiced using other variations not specifically described above.

What is claimed is:

1. A bucket wheel assembly for a fluid flow meter, comprising:
    a center frame, formed of a plastic material, having a plurality of fingers extending therefrom;
    a slot formed in each of the plurality of fingers;
    a plurality of conically shaped hollow cups having walls forming openings and apexes, formed of a plastic material, wherein the walls adjacent to the openings slide into the slots toward the apexes until contacting a bottom of the slots.

2. The bucket wheel assembly of claim 1, comprising six fingers and six hollow cups.

3. The bucket wheel assembly of claim 2, further comprising two substantially parallel protuberances on an inner surface of the plurality of hollow cups, forming a second slot, wherein a portion of the plurality of fingers fits between the protuberances when the plurality of hollow cups slide into the slots.

4. The bucket wheel assembly of claim 3, further comprising an adhesive material applied to the slots to adhere the cups to the frame.

5. The bucket wheel assembly of claim 1, wherein the wall comprises beveling as the wall approaches the openings.

6. The bucket wheel assembly of claim 1, wherein the bucket wheel assembly comprises a weight of about 1.8 ounces.

7. The bucket wheel assembly of claim 1, wherein the plastic material comprises ABS plastic.

8. A method of constructing a bucket wheel for a fluid flow meter, comprising the steps of:
    providing a center frame, formed of a plastic material, having a plurality of fingers extending therefrom, a slot formed in each of the plurality of fingers;
    providing a plurality of conically shaped hollow cups having walls forming openings and apexes, formed of a plastic material; and,
    sliding the walls adjacent to the openings into the slots.

9. The method of claim 8, wherein the plurality of conically shaped hollow cups further comprise two substantially parallel protuberances on an inner surface of the plurality of hollow cups, forming a second slot, wherein a portion of the plurality of fingers fits between the protuberances when the plurality of hollow cups slide into the slots.

10. The method of claim 9, further comprising the step of applying an adhesive material to the slots prior to the sliding step.

* * * * *